(12) United States Patent
Kameyama et al.

(10) Patent No.: US 7,044,350 B2
(45) Date of Patent: May 16, 2006

(54) CARTRIDGE FOR STAPLER AND STAPLER

(75) Inventors: Toshiyuki Kameyama, 5-3-13, Minami-Oi, Shinagawa-ku, Tokyo 140-0013 (JP); Sannosuke Kameyama, Tokyo (JP)

(73) Assignee: Toshiyuki Kameyama, Tokyo (JP)

( * ) Notice: Subject to any disclaimer, the term of this patent is extended or adjusted under 35 U.S.C. 154(b) by 0 days.

(21) Appl. No.: 10/506,330

(22) PCT Filed: Dec. 9, 2002

(86) PCT No.: PCT/JP02/12859

§ 371 (c)(1),
(2), (4) Date: Sep. 2, 2004

(87) PCT Pub. No.: WO03/095152

PCT Pub. Date: Nov. 20, 2003

(65) Prior Publication Data

US 2005/0150928 A1 Jul. 14, 2005

(30) Foreign Application Priority Data

May 9, 2002 (JP) .............................. 2002-133658

(51) Int. Cl.
*B25C 5/04* (2006.01)

(52) U.S. Cl. ...................... 227/120; 227/119; 227/134; 411/473; 411/920

(58) Field of Classification Search ................. 227/120, 227/119, 109, 134, 148, 132; 411/920, 923, 411/439, 473

See application file for complete search history.

(56) References Cited

U.S. PATENT DOCUMENTS

| 1,654,170 | A | * | 12/1927 | Hubbard ....................... 227/96 |
| 2,329,440 | A | * | 9/1943 | La Piace ..................... 411/473 |
| 2,351,043 | A | * | 6/1944 | Heller ........................... 227/79 |
| 2,887,004 | A | * | 5/1959 | Stewart ....................... 411/470 |
| 3,373,646 | A | * | 3/1968 | Ehlert ......................... 411/473 |
| 4,182,474 | A | * | 1/1980 | Sato ........................... 227/99 |
| 4,202,481 | A | * | 5/1980 | Yanagida et al. ........... 227/145 |
| 4,225,075 | A | * | 9/1980 | Chi .............................. 227/119 |
| 4,598,852 | A | * | 7/1986 | Olesen ........................ 227/119 |
| 4,878,608 | A | * | 11/1989 | Mitsuhashi ................. 227/120 |
| 6,840,422 | B1 | * | 1/2005 | Mintzer ...................... 227/109 |

FOREIGN PATENT DOCUMENTS

| JP | 2-126782 | 10/1990 |
| JP | 3-208570 | 9/1991 |

* cited by examiner

*Primary Examiner*—Scott A. Smith
(74) *Attorney, Agent, or Firm*—Wenderoth, Lind & Ponack, L.L.P.

(57) ABSTRACT

A stapler of the present invention includes a retaining part having a staple pusher, a storing section that stores a staple, and a receiving base that bends leg parts after piercing the staple pushed out by the staple pusher through a sheet material to bind the sheet material with the staple. The staple includes left and right shoulder parts against which the staple pusher abuts, leg parts extending substantially perpendicularly from the shoulder parts and a pattern part having an arbitrary shape and provided between the left and right shoulder parts. The pattern part is inclined against the leg parts and the storing section is provided, on one side thereof, with a take-out opening of the staple that is large enough to allow the pattern part to pass.

22 Claims, 7 Drawing Sheets

CARTRIDGE FOR STAPLER AND STAPLER

TECHNICAL FIELD

The present invention relates to a stapler that binds multiple sheet materials.

BACKGROUND ART

Conventionally, a staple for a stapler includes shoulder parts exposed to a surface of a sheet material and leg parts extending substantially perpendicularly from both ends of the shoulder parts. In a state in which the leg parts pierce through the multiple sheet materials, they are bent at the rear side of the sheet to bind the multiple sheet materials.

However, since the conventional staple is structured to have only a shape indispensable for ensuring a sheet binding function, the exposed portion is limited to a linear shape, so that the staple is poor in design.

Japanese Patent Laid-Open No No. 6-173917 discloses a staple in which a disc-like pattern part is formed on the shoulder parts.

However, the staple having the disc-like pattern part on the shoulder parts is of little practical use since a large number thereof cannot be stored in a cartridge at one time because of its shape. Moreover, in the case of storing the multiple staples each having the pattern part, since the pattern parts of the adjacent staples interfere with each other, the leg portions of the staple must be stored in an oblique direction to a face along a guide groove part. If the staple is pushed out from a take-out opening as it is, trouble is caused in piercing the leg parts through the sheet material to generate difficulty in performing correct binding.

The present invention has been made with consideration given to the aforementioned problem, and an object of the present invention is to provide a cartridge that is capable of storing multiple staples each having a pattern part on shoulder parts and capable of binding sheet materials correctly, and a stapler having the cartridge.

SUMMARY OF THE INVENTION

In order to solve the above problem, a first invention is a cartridge for a stapler that stores multiple staples to be closely arranged in parallel, wherein a cartridge case includes a staple take-out opening on one side. A guide groove part mounts lower ends of leg parts of the staple thereon to guide movement to the take-out opening. A spring urges the staple in the cartridge to the take-out opening side, and a staple pusher insertion opening is formed on an upper portion of the take-out opening, through which a staple pusher is inserted into the case. The staple for the stapler includes right and left shoulder parts against which the staple pusher abuts, leg parts that are bent after extending substantially perpendicularly from the shoulder parts to pierce through sheet material, and a pattern part having an arbitrary shape between the right and left shoulder parts.

According to this invention, the multiple staples are closely arranged in the cartridge in parallel, and the staples in the cartridge are urged to the take-out opening side by the spring. For the staple urged to the take-out opening, the staple pusher is inserted from the staple pusher insertion opening, which is formed on an upper portion of the take-out opening, and the shoulder parts of the staple are pushed, so that the staple is pushed out. In this way, since the pattern parts, each of which is provided between the right and left shoulders of the staple, can be contained to be put on top of one another, a large number of staples can be stored in the cartridge at one time.

Moreover, the staple with a different pattern part is inserted in the cartridge, so that sheets of paper can be bound with the staple with the different pattern part by replacement of the cartridge and a good looking appearance can be enjoyed.

A second invention is a stapler that binds sheet materials with a staple, including a retaining part having a staple pusher. A storing section stores staples, and a receiving base bends leg parts after piercing the staple pushed out by the staple pusher through the sheet materials. The staple includes right and left shoulder parts against which the staple pusher abuts, leg parts that extend substantially perpendicularly from the shoulder parts, and a pattern part having an arbitrary shape between the right and left shoulder parts and being inclined against the leg parts. The storing section has a staple take-out opening, on one side thereof, with a size that is large enough to allow the pattern part to pass.

According to the second invention, in order to bind the sheet materials, the sheet materials are placed between the receiving base and the retaining part, and the staple pusher abuts against the shoulder parts of the staple by the pressing operation of the retaining part, so that the shoulder parts are pushed out downwardly from the take-out opening. The tip ends of the leg parts of the pushed staple pierce through the sheet materials, so that the leg parts are bent, thereby the sheet materials are bound. Since the take-out opening is formed to have a size that is large enough to allow the pattern part of the staple to pass, not only the stapler with the pattern part but also the normal staple with no pattern part can be used.

A third invention is that the storing section includes a guide groove part that mounts lower ends of the leg parts of the staple thereon to guide movement to the take-out opening, and a spring that urges the staple in the cartridge to the take-out opening side. The staple is guided to a position of the take-out opening along the guide groove part by urging of the spring, and the staple is stopped at the take-out opening.

According to the third invention, since the staple stored in the storing section is guided to the take-out opening by the urging of the spring to push down the staple pusher, thereby pushing out the staple from the take-out opening, the staple can always be placed at the take-out opening and a binding operation between the staple and the sheet materials can be continuously performed.

A fourth invention is that the staple pusher includes a take-out section that guides the stored staple to the take-out opening, and a pressing section that pushes out the staple standing by at the take-out opening. When the staple pusher is pushed down, the staple of the storing section is guided to the take-out opening by the take-out section and is positioned to cause the leg parts to stand at the take-out opening. Sequentially, when the staple pusher is further pushed down, the pressing section abuts against the shoulders to be pushed out.

According to the fourth invention, in the storing section, the staple is stored in an oblique direction against a face along the guide groove part, and the staple pusher is pushed down, so that the staple is transferred to the take-out opening by the take-out section. The staple is positioned to cause the leg parts of the staple to stand at the take-out opening, and sequentially the staple pusher is further pushed down, so that the pressing section abuts against the shoulders to be pushed out, and the tip ends of the leg parts of the staple pierce through the sheet materials and the leg parts are bent, thereby the sheet materials are bound.

In this way, the staple pusher includes the take-out section that guides the staple in the storing section to the take-out opening and the pressing section that causes the leg parts to stand at the take-out opening, thereafter abutting against the shoulders to push out the staple from the take-out opening. Accordingly, even when the leg parts are arranged to be inclined against the face along the guide groove part in the storing section, the shoulder parts can be pushed down in the perpendicular direction after the leg parts are positioned perpendicularly, and the leg parts can be correctly pierced through the sheet materials, thereby making it possible to firmly bind the sheet materials with the staple.

Moreover, since the pattern part is structured to be pushed by the staple pusher, there is no need to take the shoulder parts of the staple widely, thereby making it possible to enlarge the shape of the pattern part by the corresponding amount.

A fifth invention is that a thickness of the pattern part is smaller than a width of the leg part in the staple.

According to the fifth invention, even when the staple is stored so that the leg parts are positioned perpendicularly against the face along the guide groove part, the pattern parts of the adjacent staples or the shoulder parts thereof do not interfere with each other. Accordingly, the lower ends of the leg parts of the adjacent staples are set to the same level, thereby the multiple staples can be contained to be closely arranged in parallel even if the legs parts are not contained to be inclined against the face along the guide groove part.

A sixth invention is that a width of the shoulder part in a direction of the guide groove part is smaller than a width of the leg part in the direction of the guide groove part in the staple.

According to the sixth invention, even when the staple is stored so that the leg parts are positioned to be perpendicular against the face along the guide groove part, the shoulder parts of the adjacent staples do not interfere with each other. Accordingly, the lower ends of the leg parts of the adjacent staples can be set to the same level, thereby the multiple staples can be stored to be closely arranged in parallel even if the leg parts are not contained to be inclined against the face along the guide groove part.

BRIEF DESCRIPTION OF DRAWINGS

FIG. 12 (*b*) is a perspective view illustrating a modification of the staple according to the fourth embodiment of the present invention.

DETAILED DESCRIPTION OF THE INVENTION

The following will specifically explain embodiments of the present invention based on the drawings.

Figure 1:
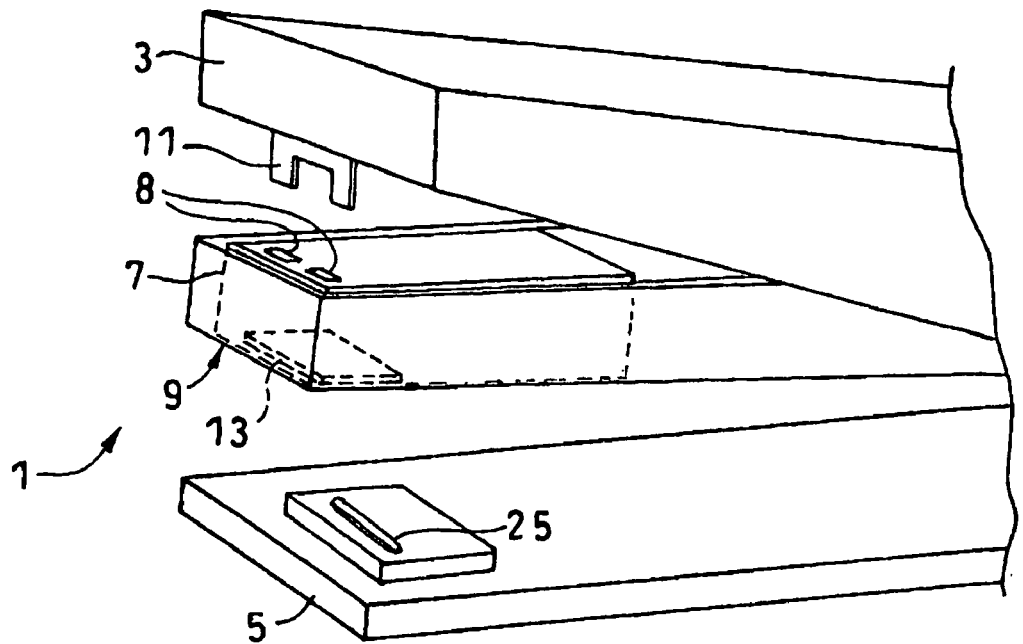
FIG. 1 is a perspective view schematically illustrating a stapler according to an embodiment of the present invention.
Figure 2:
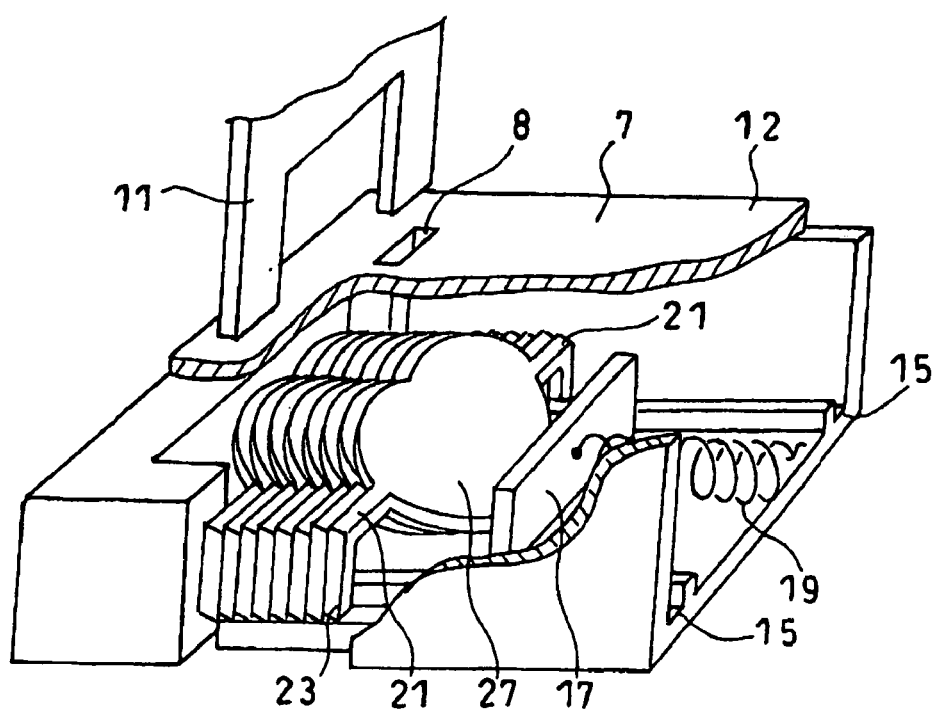
FIG. 2 is a perspective view illustrating a structure of a cartridge of FIG. 1.
Figure 3:
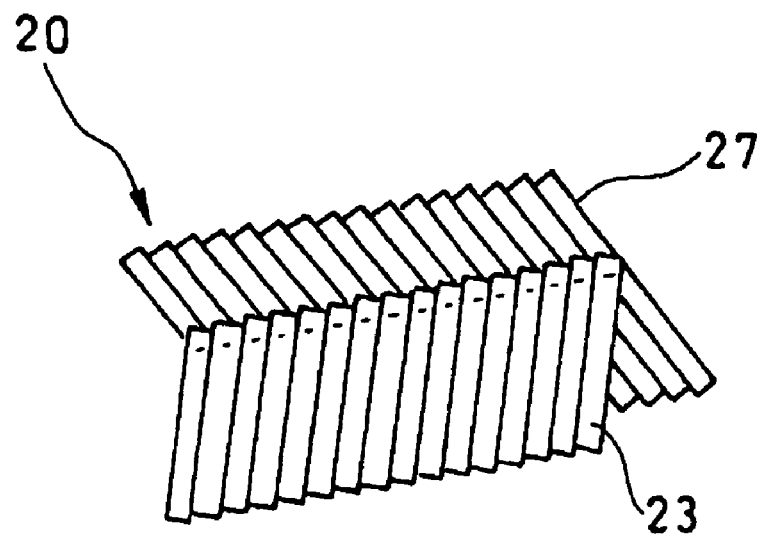
FIG. 3 is a side view of staples stored in the cartridge of FIG. 2.
Figure 4:
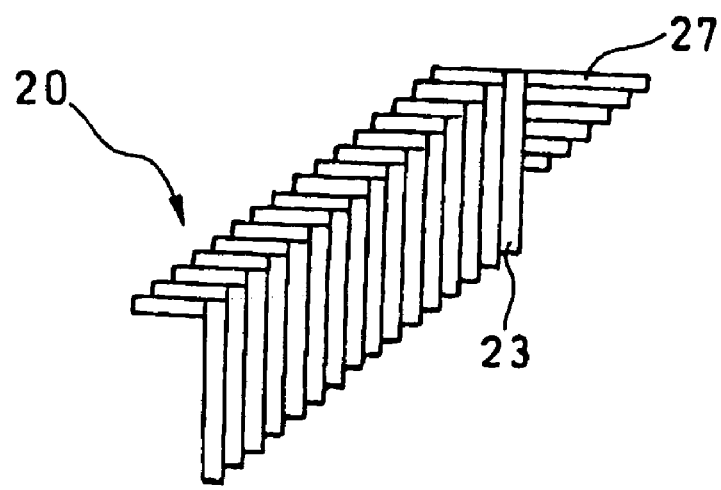
FIG. 4 is a side view illustrating a modification of the staples of FIG. 3.
Figure 5:
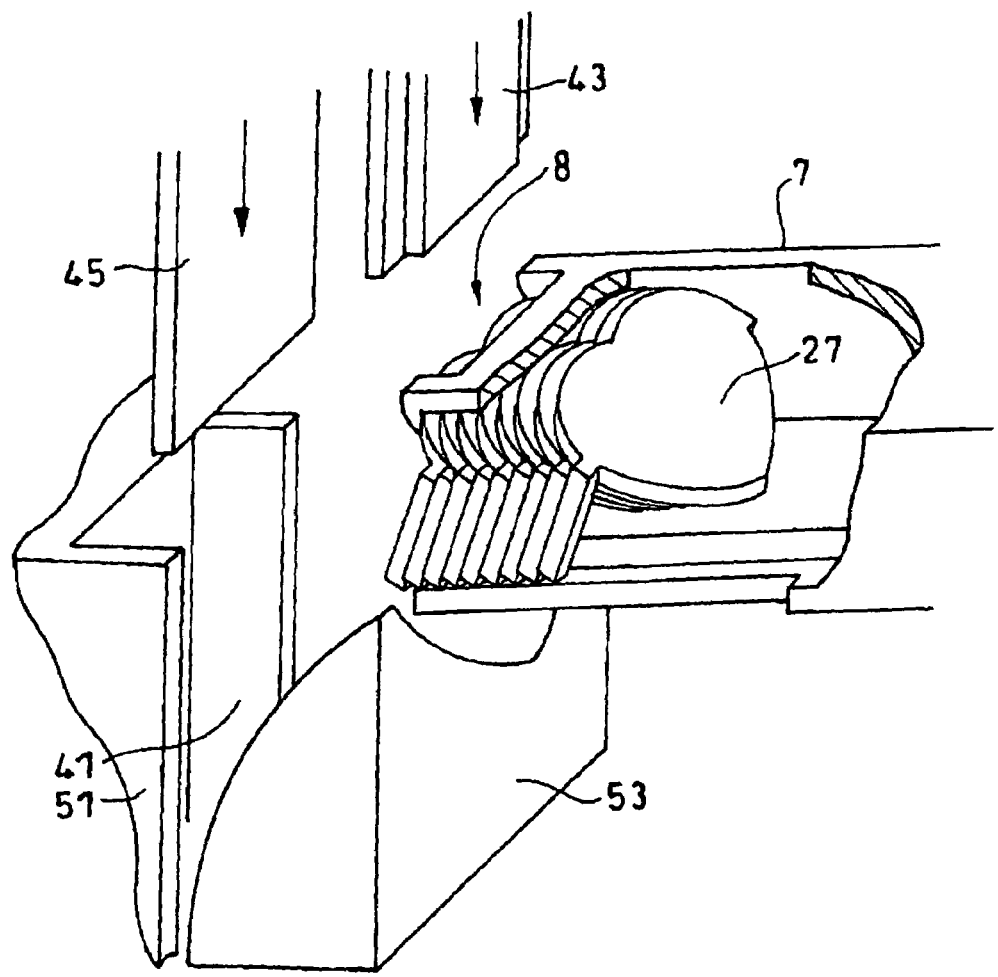
FIG. 5 is a perspective view illustrating a stapler according to a second embodiment of the present invention.
Figure 6:
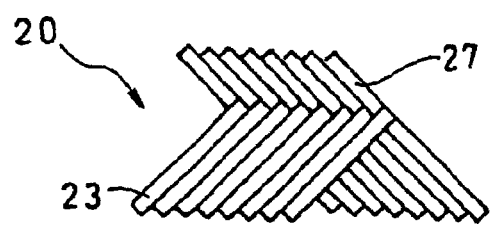
FIG. 6 is a side view illustrating staples to be stored in the cartridge of FIG. 5.
Figure 7:
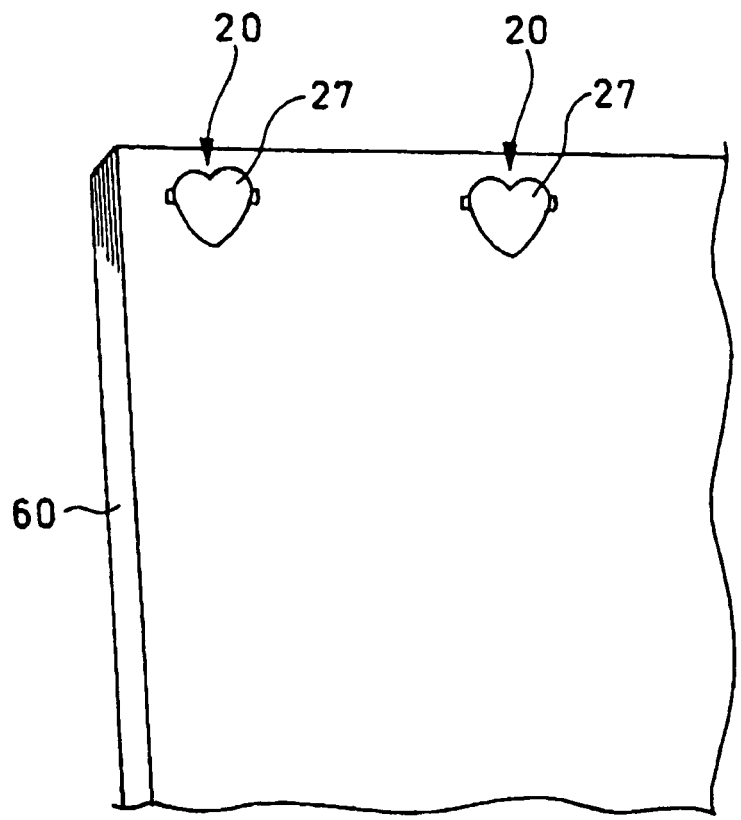
FIG. 7 is a front view of each staple in a state that sheets of paper are bound.

FIG. 1 is a perspective view schematically illustrating a stapler according to an embodiment of the present invention; FIG. 2 is a perspective view illustrating a structure of a cartridge of FIG. 1; FIG. 3 is a side view of staples stored in the cartridge of FIG. 2; FIG. 4 is a side view illustrating a modification of the staples of FIG. 3; FIG. 5 is a perspective view illustrating a stapler according to a second embodiment of the present invention; FIG. 6 is a side view illustrating staples to be stored in the cartridge of FIG. 5; and FIG. 7 is a front view of each staple in a state that sheets of paper are bound.

A stapler 1 according to a first embodiment includes a staple receiving base 5 and a retaining part 3 having a staple pusher 11 rotatably provided at an end portion side of the receiving base 5, and a staple storing section 9 is provided between the receiving base 5 and the retaining part 3. A cartridge 7, which has multiple staples 20 for the stapler 1 stored in parallel, is attached to the storing section 9.

The retaining part 3 includes the staple pusher 11 that pushes out each staple 20 stored in the cartridge 7 through a take-out opening 13, and a central portion of the staple pusher 11 is notched so that the staple pusher 11 abuts against shoulder parts 21 of the staple according to the present invention.

The receiving base 5 has a groove-like bending section 25 that is placed at a position opposite to the staple pusher 11 of the retaining part 3 and bends leg parts 23 of the staple 21.

The cartridge 7 has the take-out opening 13 for staple 20 on one side of a case 12. Moreover, a guide groove part 15 is formed at each side of a bottom part of the case 12, and the top ends of the leg parts 23 of each staple 20 are placed on the guide groove part 15. At a position opposite to the take-out opening 13 and abutting against the staple 20, a movable plate 17 is provided, and a spring 19 for urging the staple 20 in a direction of (toward) the take-out opening 13 is attached between the movable plate 17 and the case 12. The movable plate 17 is always urged in the direction of the take-out opening 13 by the spring 19, so that the staple 20 contained at the front side of the movable plate 17 is pushed out in the direction of the take-out opening 13. Above, the take-out opening 13, there is formed an insertion hole (staple pusher insertion hole) 8 for inserting the staple pusher 11.

The staple 20 stored in the cartridge 7 includes right and left shoulder parts 21 against which the staple pusher 11 provided in the retaining part 3 abuts, and leg parts 23 that are bent after extending substantially perpendicularly from both ends of the shoulder parts 21 and piercing through sheet materials 60. A pattern part 27 with an arbitrary shape is provided between the shoulder parts so as to be inclined with respect to the leg parts 23.

As illustrated in the figure, the pattern part 27 has a heart-shaped surface and the pattern part 27 is provided to be inclined with respect to the leg parts 23. In addition, the pattern part 27 and the leg parts 23 may be arranged to be substantially T-shaped.

Regarding the staples 20 in the cartridge 7, the multiple staples 20 are stored to be closely arranged in parallel, and the respective pattern parts 27 are set to be put on top of one another at the time of storing the staples 20. In addition, the staples 20 are temporarily fixed with paste, only a portion where the leg parts 23 come in contact with each other is pasted, and only the staple 20, which is pushed by a sheeting operation, is pushed out from the take-out opening 13.

An explanation will next be given of an operation of this embodiment based on the aforementioned structure. In the case where the stapler 1 is used, the retaining part 3 is first rotated to be opened (separated) from the receiving base 5, and the cartridge 7 where the staples 20 are stored is set in a storing section 9.

Then, at the time of binding sheet materials 60, multiple sheet materials 60 are placed between the receiving base 5 and the retaining part 3, and the staple 20 is pushed out by the pushing operation of the retaining part 3 to bind the sheet materials 60. More specifically, by the pushing operation of the retaining part 3, the staple pusher 11 enters from the insertion holes 8 on the upper portion of the cartridge 7, so that the shoulder parts 21 of one staple 20 placed at the take-out opening of the cartridge 7 are pushed. The top ends of the pushed shoulder parts 21 of the staple 20 pierce through the multiple sheet materials. Then, the leg parts 27 are bent by the bending section 25, so that the multiple sheet materials are bound by the staple 20.

In the cartridge 7, after ending one binding operation, the movable plate 17 is urged in the direction of the take-out opening 13 by the spring 19, so that the remaining staples 20 are pushed in the direction of the take-out opening 13 and the aforementioned operation is repeated.

Since the pattern part 27 appears on the surface of the sheet in the state that the sheet materials 60 are thus bound, the exposed portion is not limited to the conventional linear shape, and the pattern part 27 is formed on the so-called stapled paper surface to provide a good-looking appearance and an unexpected result.

Moreover, since the pattern part 27 is attached to the shoulder parts 21 of the staple 20 corresponding to the binding portion of the sheet materials 60 and the sheet materials are retained by the sheet pattern part 27, the sheet materials 60 are less likely to come off the staple 20 after being bound as compared with the case in which the sheet materials are bound with the linear staple.

Furthermore, since the pattern part 27 is attached to the shoulder parts 21 of the staple 20, the pattern part 27 can be taken up from the sheet materials to be easily detached therefrom.

Another embodiment is next explained, and in the explanation, the same reference numerals as those of the aforementioned embodiment are added to the same parts as those of the aforementioned embodiment and the explanation is omitted. As illustrated in FIG. 5, according to the second embodiment, in the staple 20 stored in the cartridge 7, the pattern part 27 and the leg parts 23 are substantially T-shaped, and the tip ends of the leg parts 23 and the lower end of the pattern part 27 are abutted against the guide groove part 15 of the storing section 9 where staples 20 are stored to be closely arranged in parallel, and the pattern part 27 is stored to be inclined against the leg parts 23. The retaining part 3 includes a pickup cutter 43, which drops the staple 20 stored in the cartridge 7 on a standby section 41, and a push-out cutter 45, which is provided at the take-out opening 13 for the pick-up cutter 43 to push out the staple 20 that stands by in the standby section 41.

The insertion hole 8, which is provided on the upper portion of one side of the cartridge 7, is shaped to expose the entirety of the pattern part 27 of the staple 20. Moreover, the pickup cuter 43, which picks up the staple 20 through the insertion opening 8, is convex shaped at the cartridge side 7. Furthermore, the standby section 41 is provided at the lower section of the take-out opening 13 of the cartridge 7. The standby section 41 includes a positioning guide 51, which positions the leg parts 23 of the staple 20 pushed out from the cartridge 7, and an introduction guide 53, which is provided at a position opposite to the positioning guide 51, and the staple 20 is once stood by the standby section 41 to correct the posture of the leg parts 23 of the staple 20 to be perpendicular to the sheet materials, thereafter the staple 20 is pushed out.

Thus, since the pattern part 27 is structured to be pushed by the pickup cutter 43 or the push-out cutter 45, there is no need to take the shoulder parts 21 of the staple 20 widely, making it possible to enlarge the shape of the pattern part 27 by the corresponding amount.

Figure 8:
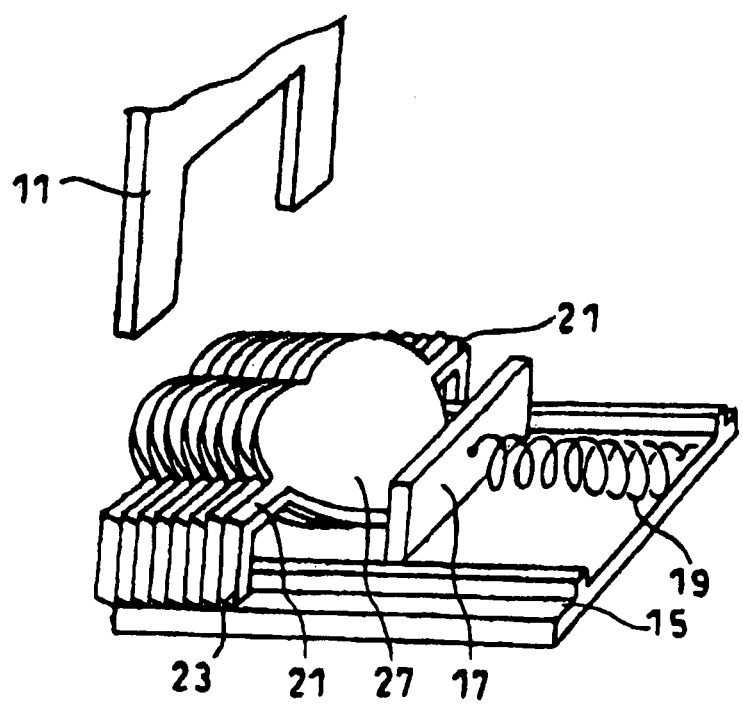
FIG. 8 is a perspective view illustrating a storing section according to a third embodiment of the present invention.
Figure 9:
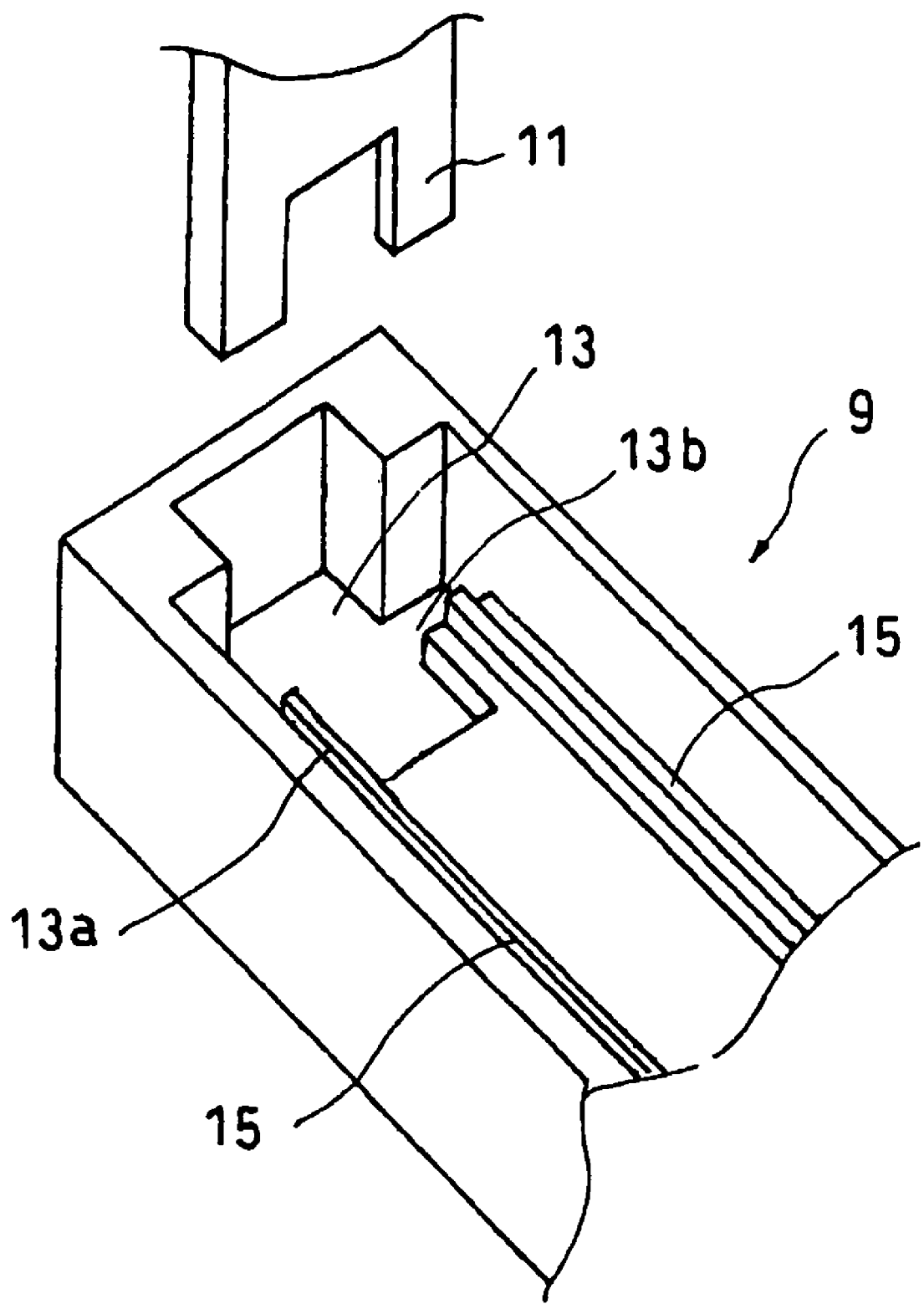
FIG. 9 is a perspective view illustrating a periphery of a take-out opening relating to the storing section of FIG. 8.

An explanation is next given of a third embodiment with reference to FIGS. 8 and 9. The third embodiment is different from the aforementioned first and second embodiments in the point that the staples 20 are directly stored in the storing section 9 without using the cartridge 7 and the staple 20 is pushed out from the take-out opening 13 by the staple pusher 11.

The take-out opening 13 of the storing section 9 is formed to have a size that is large enough to allow the pattern part 27 of the staple 20 to pass and is divided into a pattern part passing opening 13*a* through which the pattern part 27 passes and a shoulder part passing opening 13*b* through which the shoulder parts 21 pass. In this way, since the take-out opening 13 is formed to have a size that is large enough to allow the pattern part 27 of the staple 20 to pass, it is possible to use a general staple having no pattern part 27 due to the shoulder part passing opening 13*b* through which the shoulder parts 21 pass.

Figure 10:
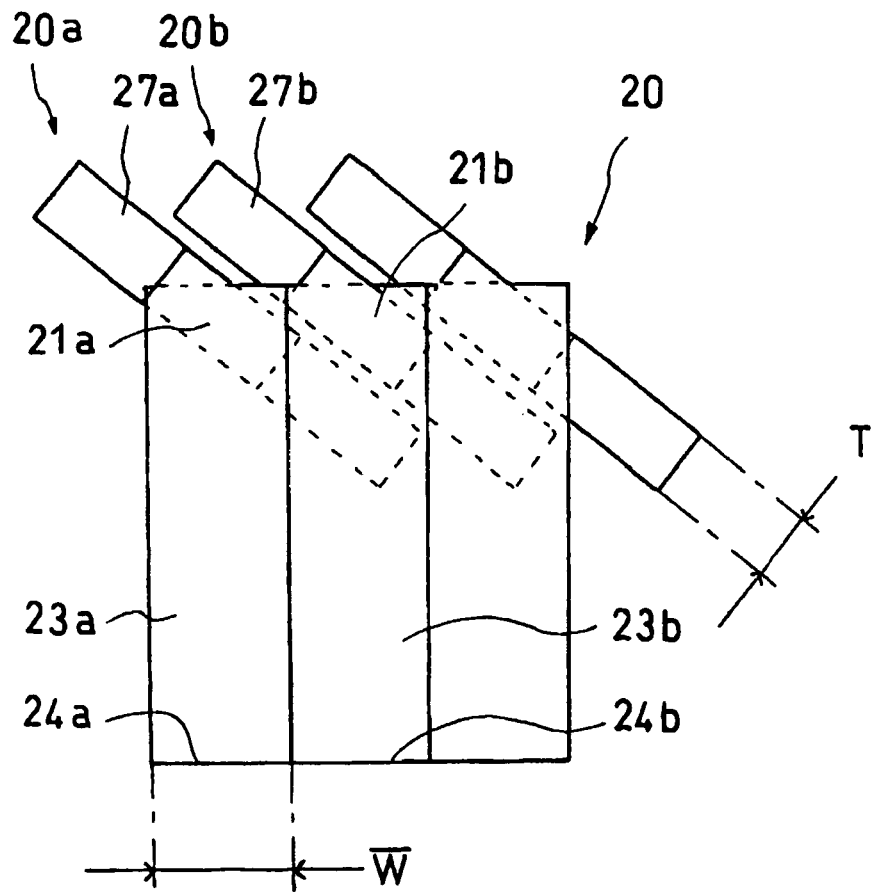
FIG. 10 is a front view illustrating a staple according to a fourth embodiment of the present invention.

An explanation is next given of a fourth embodiment with reference to FIG. 10. In the fourth embodiment, the thickness ((T) in FIG. 10) of the pattern part 27 of the staple 20 is smaller than the width ((W) in FIG. 10) of the leg part 23 in the direction along the guide groove part 15 (as used herein, width refers to the dimension in the direction of the guide groove part 15). In this way, the thickness (T) of the pattern part 27 is provided to be smaller than the width (W) of the leg part 23 in the direction along the guide groove part 15. Therefore, even when the staple 20 is stored so that the leg parts 23 are perpendicular to the face along the guide groove part 15, a pattern part 27*a* of one staple 20*a* or a shoulder part 21*a* does not interfere with a pattern part 27*b* of an adjacent staple 20*b* or a shoulder part 21*b*, and lower ends 24*a* and 24*b* of leg parts 23*a* and 23*b* of the adjacent staples 20*a* and 20*b* are at the same level. Accordingly, multiple staples 20 can be stored to be closely arranged in parallel without inclining the legs 23 against the face along the guide groove part 15 at the time of storing the staples 20.

Figure 12:
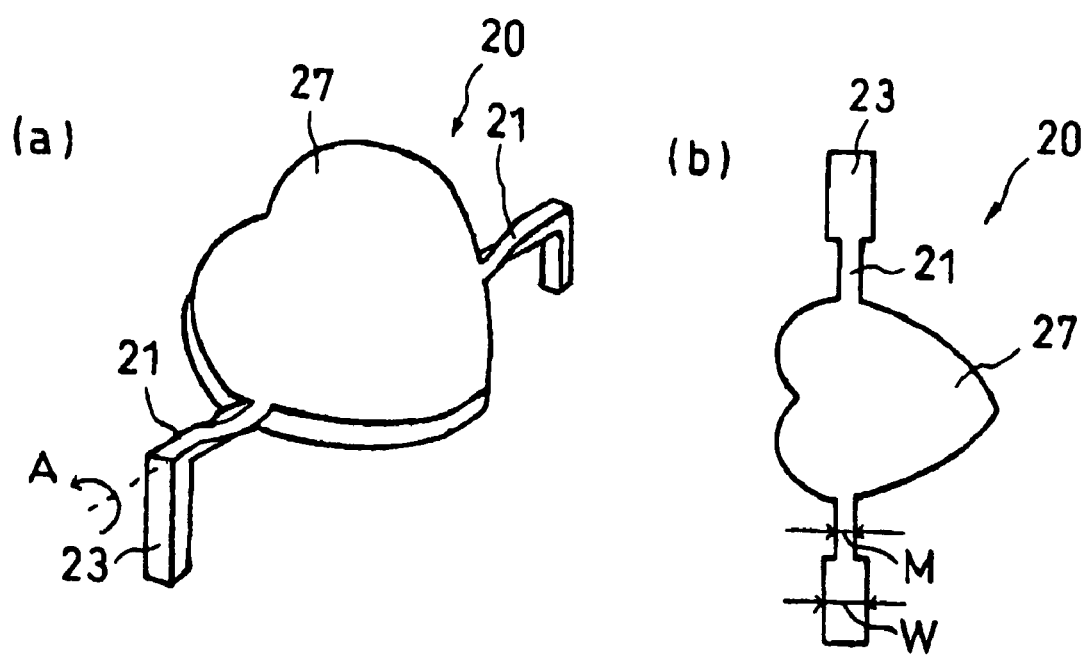
FIG. 12 (*a*) is a perspective view illustrating a modification of the staple according to the fifth embodiment of the present invention.

A modification of the fourth embodiment is next explained. As illustrated in FIG. 12(*b*), when a width of the shoulder part 21 in the direction along the guide groove part 15 is M and a width of the leg part 23 in the direction along the guide groove part 15 is W, the width M of the shoulder part 21 is made smaller than the width W of the leg part 23. Therefore, when the staples 20 are closely arranged in parallel, the shoulder parts 21 of one of the adjacent staples 20 do not interfere with the shoulder parts 21 of the other staple 20, and multiple staples 20 can be stored to be closely arranged in parallel without inclining the legs 23 against the face along the guide groove part 15 at the time of storing the staples 20, similar to the fourth embodiment.

Additionally, in the case where the staple 20 with the pattern part 27 and the normal staple are used together, the width W of the leg part 23 is provided to be the same as that of the leg part of the normal staple.

Figure 11:
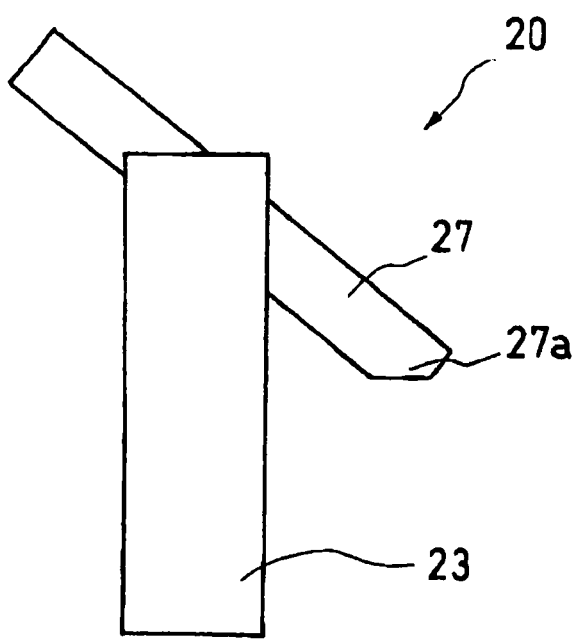
FIG. 11 is a front view illustrating a staple according to a fifth embodiment of the present invention.

An explanation is next given of a fifth embodiment. As illustrated in FIG. 11, in the fifth embodiment, a lower end 27a of the pattern part 27 of the staple 20 is chamfered. In this way, since the lower end 27a of the pattern part 27 is chamfered, an extra force is not required at the time of binding the sheet materials 60, so that a smooth binding operation can be obtained. More specifically, when the shoulder parts 21 of the staple 20 are seated from an upper portion, the tip ends of the leg parts 23 of the staple 20 pierce through the sheet materials 60 and the leg parts 23 are bent. At the same time, the lower end 27a of the pattern part 27 comes in contact with the sheet material 60, and when further pressing is applied from an upper portion, the pattern part 27 is changed from the inclination state against the surface of the sheet material 60 to the parallel state. At this time, since the lower end 27a of the pattern part 27 is chamfered, the pattern part 27 is allowed to be parallel to the surface of the sheet material 60 after the lower end 27a of the pattern part 27 comes in contact with the sheet material 60, so that an amount of force to press the staple 20 from an upper portion may be small.

A modification of the fifth embodiment is next explained. As illustrated in FIG. 12(a), in this modification, a twist is formed in the shoulder parts 21 of the staple 20. The twist is formed by axially rotating the shoulder parts 21 in a direction illustrated by an arrow A, so that the pattern part 27 is easily rotated in the direction illustrated by the same arrow A. In this way, since the twist is formed in the shoulder parts 21, the pattern part 27 can be easily changed from the inclination state against the surface of the sheet material 60 to the parallel state, so that an extra force is not required at the time of binding the sheet materials 60 and a smooth binding operation can be obtained. In addition, it is desirable that the length of the twisting portion should be as short as possible. Since a portion of the shoulder parts 21 in which no twist is formed is flat on its upper surface, the staple pusher 11 easily comes in contact therewith and the staple 20 is smoothly pushed out if the length of the twisting portion is short.

The present invention is not limited to the above described embodiments, and various modifications may be possible without departing from the scope of the present invention. For example, though the pattern part 27 is heart-shaped in the present embodiments, the present invention is not limited to this and a triangle, a square, or a polygon such as a triangle and the like, or a circle, an ellipse may be possible. Moreover, coloring and characters may be added to the surface of the pattern part 27.

In the third embodiment, the take-out opening 13 is formed on the storing section 9 to have a size that is large enough to allow the pattern part 27 of the staple 20 to pass. However, the present invention is not limited to this and the take-out opening 13 of the cartridge 7 may be the take-out opening 13 having a size that is large enough to allow the pattern part 27 to pass as illustrated in FIG. 9.

Figure 13:
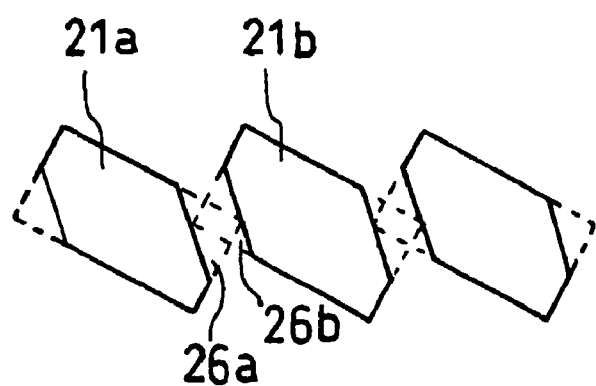
FIG. 13 is a view illustrating a modification of the staple according to the fourth embodiment of the present invention.

In the fourth embodiment, the thickness (T) of the pattern part 27 of the staple 20 is smaller than the width (W) of the leg part 23 in the direction along the guide groove part 15, thereby making it possible to arrange the leg parts 23 perpendicularly to the face along the guide groove part 15 at the time of storing the staples 20. However, the present invention is not limited to this. In the case where the twist is formed in the shoulder parts 21 of the staple 20 as illustrated in FIG. 12, portions 26a and 26b of the shoulder parts 21a and 21b of the adjacent staples 20, which interfere with each other, are chamfered as illustrated in FIG. 13, thereby making it possible to prevent the staples 20 from interfering with each other. Even in this case, it is possible to contain the multiple staples 20 to be closely arranged in parallel in the state that the leg parts 23 are arranged to be perpendicular to the face along the guide groove part 15 at the time of storing the staples 20 as illustrated in FIG. 10. The shoulder parts 21 of the staple 20 may form a part of the pattern part 27 without projecting from the pattern part 27.

The material of the staple 20 may be a resin material and others without being limited to metal.

Though the guide groove part 15 has a projection along a longitudinal direction at a position away from both walls of the storing section 9, the leg parts 23 of the staple 20 may be guided by abutting against both walls of the storing section 9 directly without having the projection.

In the first embodiment, the cartridge 7 is set in the storing section 9 by rotating the retaining part 3 from the receiving base 5 to be opened. However, the present invention is not limited to this and this may be inserted from the front side of the storing section 9 of the stapler 1 or the back side thereof.

INDUSTRIAL APPLICABILITY

As mentioned above, the present invention is used as a cartridge for a stapler suitable for binding multiple sheet materials with staples and a stapler.

The invention claimed is:

1. An apparatus comprising:
  a stapler having a staple pusher;
  a cartridge attached to a storing section of said stapler, said cartridge including:
    a take-out opening;
    a guide groove part for guiding a staple toward said take-out opening;
    a spring for urging said staple in said cartridge toward said take-out opening; and
    an insertion hole formed on an upper portion of said take-out opening to allow said staple pusher to be inserted into said cartridge; and
  said staple being accommodated in said cartridge and having:
    a right shoulder part and a left shoulder part against which said staple pusher is to abut;
    leg parts extending substantially perpendicularly from said shoulder parts; and
    an arbitrarily-shaped pattern part located between said right shoulder part and said left shoulder part and being inclined with respect to said leg parts, a thickness of said pattern part being smaller than a width of each of said leg parts;
  wherein said guide groove part is shaped and arranged to guide lower ends of said leg parts toward said take-out opening.

2. The apparatus of claim 1, wherein a width of each of said right shoulder part and said left shoulder part is less than the width of each of said leg parts.

3. An apparatus comprising:
  a retaining part including a staple pusher;

a storing section for storing staples and having a take-out opening, said staples being arranged in said storing section so that lower ends of multiple adjacent staples are located on a substantially horizontal plane; and a receiving base;

each of said staples having:

a right shoulder part and a left shoulder part against which said staple pusher is to abut;

leg parts extending substantially perpendicularly from said shoulder parts; and an arbitrarily-shaped pattern part located between said right shoulder part and said left shoulder part and being inclined with respect to said leg parts, a thickness of said pattern part being smaller than a width of each of said leg parts;

wherein said receiving base is shaped and arranged to bend said leg parts after said leg parts are pierced through sheet materials when pushed by said staple pusher; and wherein said take-out opening is sized to allow said pattern part of each of said staples to pass therethrough.

4. The apparatus of claim 3, wherein the storing section includes:

a guide groove part for guiding lower ends of said leg parts of said staple toward said take-out opening; and a spring for urging each of said staples in said storing section toward said take-out opening while each of said staples is guided by said guide groove part, said storing section being shaped to stop each of said staples at said take-out opening.

5. The apparatus of claim 4, wherein said staple pusher includes:

a take-out section for guiding each of said staples to said take-out opening; and a pressing section for pushing out each of said staples positioned at said take-out opening, said staple pusher being arranged so that, when said staple pusher is pushed down, one of said staples arranged in said storing section is guided to said take-out opening by said take-out section and is positioned so that said leg parts are located at said take-out opening, and so that when said staple pusher is pushed further down, said pressing section abuts against said shoulder parts of said one of said staples.

6. The apparatus of claim 4, wherein a width of each of said right shoulder part and said left shoulder part is less than the width of each of said leg parts.

7. The apparatus of claim 4, wherein a corner portion of a lower end of said pattern part of each of said staples is chamfered.

8. The apparatus of claim 4, wherein each of said right shoulder part and said left shoulder part has an axial twist, and said pattern part is inclined with respect to said leg parts.

9. The apparatus of claim 3, wherein a width of each of said right shoulder part and said left shoulder part is less than the width of each of said leg parts.

10. The apparatus of claim 3, wherein said staple pusher includes:

a take-out section for guiding each of said staples to said take-out opening; and a pressing section for pushing out each of said staples positioned at said take-out opening, said staple pusher being arranged so that, when said staple pusher is pushed down, one of said staples arranged in said storing section is guided to said take-out opening by said take-out section and is positioned so that said leg parts are located at said take-out opening, and so that when said staple pusher is pushed further down, said pressing section abuts against said shoulder parts of said one of said staples.

11. The apparatus of claim 10, wherein a width of each of said right shoulder part and said left shoulder part is less than the width of each of said leg parts.

12. The apparatus of claim 10, wherein a corner portion of a lower end of said pattern part of each of said staples is chamfered.

13. The apparatus of claim 10, wherein each of said right shoulder part and said left shoulder part has an axial twist, and said pattern part is inclined with respect to said leg parts.

14. The apparatus of claim 3, wherein a width of each of said right shoulder part and said left shoulder part is less than the width of each of said leg parts.

15. The apparatus of claim 14, wherein a corner portion of a lower end of said pattern part of each of said staples is chamfered.

16. The apparatus of claim 14, wherein each of said right shoulder part and said left shoulder part has an axial twist, and said pattern part is inclined with respect to said leg parts.

17. The apparatus of claim 3, wherein a corner portion of a lower end of said pattern part of each of said staples is chamfered.

18. The apparatus of claim 17, wherein each of said right shoulder part and said left shoulder part has an axial twist, and said pattern part is inclined with respect to said leg parts.

19. The apparatus of claim 3, wherein each of said right shoulder part and said left shoulder part has an axial twist, and said pattern part is inclined with respect to said leg parts.

20. The apparatus of claim 19, wherein each of said right shoulder part and said left shoulder part has a cut-out portion to prevent adjacent staples from interfering with each other.

21. A staple comprising:

a right shoulder part and a left shoulder part against which a staple pusher is to abut;

leg parts extending substantially perpendicularly from said shoulder parts; and an arbitrarily-shaped pattern part located between said right shoulder part and said left shoulder part and being inclined with respect to said leg parts, a thickness of said pattern part being smaller than a width of each of said leg parts.

22. The staple of claim 21, wherein a width of each of said right shoulder part and said left shoulder part is less than the width of each of said leg parts.

* * * * *